(12) United States Patent
Soulie et al.

(10) Patent No.: US 10,839,486 B2
(45) Date of Patent: Nov. 17, 2020

(54) METHOD FOR PROCESSING IMAGES

(71) Applicant: Bertin Technologies, Montigny le Bretonneux (FR)

(72) Inventors: Emmanuel Soulie, Gardanne (FR); David Oriot De La Chapelle, Saint Chamas (FR); Damien Diaz, Calas (FR)

(73) Assignee: Bertin Technologies, Montigny (FR)

( * ) Notice: Subject to any disclaimer, the term of this patent is extended or adjusted under 35 U.S.C. 154(b) by 29 days.

(21) Appl. No.: 16/083,116

(22) PCT Filed: Mar. 13, 2017

(86) PCT No.: PCT/FR2017/050566
§ 371 (c)(1),
(2) Date: Sep. 7, 2018

(87) PCT Pub. No.: WO2017/153700
PCT Pub. Date: Sep. 14, 2017

(65) Prior Publication Data
US 2019/0066266 A1     Feb. 28, 2019

(30) Foreign Application Priority Data
Mar. 11, 2016   (FR) ..................................... 16 52068

(51) Int. Cl.
*G06T 5/00*   (2006.01)
*G06T 3/40*   (2006.01)
(Continued)

(52) U.S. Cl.
CPC ............ *G06T 3/4061* (2013.01); *G06F 17/10* (2013.01); *G06T 5/50* (2013.01); *G06T 2207/20221* (2013.01)

(58) Field of Classification Search
CPC ..................... G06T 3/4061; G06T 5/50; G06T 2207/20221; G06F 17/10
See application file for complete search history.

(56) References Cited

U.S. PATENT DOCUMENTS 5,488,674 A * 1/1996 Burt .......................... G06T 5/50
345/639
7,340,099 B2 * 3/2008 Zhang ....................... G06T 5/50
348/33

(Continued)

OTHER PUBLICATIONS

International Search Report from corresponding International Patent Application No. PCT/FR2017/050566, dated Jun. 8, 2017.

(Continued)

*Primary Examiner* — Ping Y Hsieh
(74) *Attorney, Agent, or Firm* — Kusner & Jaffe

(57) ABSTRACT

An image processing method using a first image sensor covering the visible range and a second sensor covering the infra-red range. The method includes a) acquiring a first image $I_1$ of said given zone of space by means of the first image sensor, b) acquiring a second image $I_2$ of said given zone of space by means of the second image sensor, c) performing a decomposition of the first image $I_1$ so as to obtain at least one luminance image $I_{1L}$, d) obtaining an image $I_f$ resulting from digital fusion of the luminance image $I_{1L}$ and of the second image $I_2$, e) adding colour information to the fusion image $I_f$ or during the fusion stage d).

13 Claims, 3 Drawing Sheets

(51) Int. Cl.
*G06T 5/50* (2006.01)
*G06F 17/10* (2006.01)

(56) References Cited

U.S. PATENT DOCUMENTS

| | | | | |
|---|---|---|---|---|
| 2004/0028271 | A1* | 2/2004 | Pollard | H04N 1/58 |
| | | | | 382/162 |
| 2009/0169102 | A1 | 7/2009 | Zhang et al. | |
| 2010/0183071 | A1* | 7/2010 | Segall | G06T 5/50 |
| | | | | 375/240.16 |
| 2015/0215529 | A1* | 7/2015 | Wang | G06T 5/007 |
| | | | | 348/218.1 |
| 2015/0288950 | A1* | 10/2015 | Zhang | H04N 5/33 |
| | | | | 348/47 |
| 2016/0080706 | A1* | 3/2016 | Kaiser | H04N 9/045 |
| | | | | 348/280 |
| 2017/0213330 | A1* | 7/2017 | Pudipeddi | G06T 5/50 |

OTHER PUBLICATIONS

González-Audícana et al., "Fusion of Multispectral and Panchromatic Images Using Improved IHS and PCA Mergers Based on Wavelet Decomposition," IEEE Transactions on Geoscience and Remote Sensing, vol. 42, No. 6, Jun. 1, 2014, pp. 1291-1299.

Gungor et al., "A Statistical Approach to Multiresolution Image Fusion," engineering.purdue.edu/~jshan/publications/2005/Pecora_2005_Fusion.pdf, Oct. 23, 2005, Abstract.

Al-Wassai et al., "The Statistical Methods of Pixel-Based Image Fusion Techniques," arxiv.org/ftp/arxiv/papers/1108/1108.3250.pdf, Aug. 1, 2011, Abstract.

Ghassemian, "Multi-Sensor Image Fusion Using Multirate Filter Banks," Proceedings 2001 International Conference on Image Processing, vol. 1, Oct. 7, 2001, pp. 846-849.

Chai et al., "Self-Adaptive Image Fusion Based on Multi-Resolution Decomposition Using Wavelet Packet Analysis," Machine Learning and Cybernetics, vol. 7, Aug. 26, 2004, pp. 4049-4053.

Mahyari et al., "Panchromatic and Multispectral Image Fusion Based on Maximization of Both Spectral and Spatial Similarities," Proceedings of the Third International Conference on Machine Learning and Cybernetics, vol. 49, No. 6, Jun. 1, 2011, pp. 1976-1985.

* cited by examiner

| Level of Darkness | 1 | 2 | 3 | 4 | 5 |
|---|---|---|---|---|---|
| Source of Light | <br>Full moon | <br>Half moon | <br>Partial moon | <br>Bright starry sky | <br>Covered sky |
| Values (mlux) | 1000 ⇔ 40 | 40 ⇔ 10 | 10 ⇔ 2 | 2 ⇔ 0.7 | 0.7 ⇔ 0 |

METHOD FOR PROCESSING IMAGES

FIELD OF THE INVENTION

The invention relates to an image processing method intended for discriminating analysis of a given observed zone of space. The discriminating analysis may for example consist of threat detection.

BACKGROUND OF THE INVENTION

In a field of operations, it may be necessary to have optical threat detection tools/devices available, both during the daytime and in periods of lower luminosity, particularly at night.

Devices are known that comprise a casing housing two image sensors, a first of which is capable of covering a first spectral range and a second of which is capable of covering a second spectral range which is different from the first spectral range, wherein the first and second image sensors are capable of forming images of the same given zone of space and processing means capable of detecting a threat located in said zone based on the images obtained from the first sensor and/or the second sensor.

Use of several image sensors capable of covering different spectral ranges allows detection of a large number of threats, particularly threats having very different wavelengths. It is also possible to distinguish several types of threat, depending on whether they are detected by the first sensor and/or by the second sensor.

The processing means implemented in this type of device do not however allow use under conditions of low luminosity, such as those encountered at night, so that the data displayed by the sensors usually do not prove sufficiently relevant for an observer.

The present invention particularly aims to avoid these disadvantages in a simple, effective and economical manner.

SUMMARY OF THE INVENTION

The present invention provides for a method of processing images using a device comprising at least one casing comprising at least one image sensor capable of covering a first spectral range and at least one second image sensor capable of covering a second spectral range different from the first spectral range, wherein the first and second sensors are capable of forming images of a same zone of space, with the first sensor being capable of covering a spectral range belonging to the range of wavelengths of the visible spectrum, wherein the method involves:

a) acquiring a first image $I_1$ of said given zone of space by means of the first image sensor, b) acquiring a second image $I_2$ of said given zone of space by means of the second image sensor, c) performing a decomposition of the first image $I_1$ so as to obtain at least one luminance image $I_{1L}$, d) obtaining an image $I_f$ resulting from digital fusion of the luminance image $I_{1L}$ and of the second image $I_2$, c) adding colour information to the fusion image $I_f$ or during the fusion stage d).

Digital fusion of two images (in this case $I_{1L}$ and $I_2$,) means pixel-level fusion; i.e. fusion is performed directly based on the pixel values of the images, on the entirety of each image.

Unlike the image processing methods of the prior art, the invention provides for analysing the quantity of data of each of respectively the first image $I_1$ obtained in the visible range and second image $I_2$, obtained for example in the infra-red range and digitally fusing them into a new fusion image $I_f$ and adding colour information. In this manner, the final image obtained makes it possible to restore to a user an image containing colour information more easily interpretable by a human eye owing to its high sensitivity to visible wavelengths.

According to another characteristic, the method involves, prior to stage c), adapting the dimensions of that of the first image $I_1$ and of the second image $I_2$ having the lowest resolution to the dimensions of the other of the first image and the second image.

This deformation stage furthermore serves to perform operators of enlargement, rotation, shift and correction of the geometric aberrations on the image having the lowest resolution.

Prior to stage c), the method also involves matching the dynamics of the first image to the dynamics of the second image.

This adaptation of dynamics essentially aims to make the first and second images comparable and allow extraction of a maximum amount of data from the images during the subsequent stages.

According to one particular embodiment of the invention, the digital fusion includes a stage of carrying out successive spatial frequency decompositions n of the luminance image $I_{1L}$ and of the second image $I_2$.

These frequency decompositions make it possible to interpret the contents of each of the images of luminance $I_{1L}$ and of the second image $I_2$ locally, i.e. at the level of each pixel analysed.

According to another characteristic of the method, the digital fusion stage involves:

i. carrying out decompositions, noted respectively $F_n^{1L}$ and $F_n^2$, into successive spatial frequencies n of the luminance image $I_{1L}$ and of the second image $I_2$, ii. performing an energy calculation in at least some of the zones of the images $F_n^{1L}$, $F_n^2$ each associated with a frequency component n, iii. calculating a weighting image $P_n^{1L}$, $P_n^2$, for each of the images $F_n^{1L}$, $F_n^2$ associated with a frequency component n, based on the local analysis performed at the preceding stage, iv. for each image $F_n^{1L}$, $F_n^2$ associated with a frequency component, performing the following calculation:

$$F'_n(x,y) = P_n^{1L}(x,y) \cdot F_n^{1L}(x,y) + P_n^2(x,y) \cdot F_n^2(x,y)$$

v. performing a recombination of all the images $F'_n$ each associated with a frequency component n, so as to obtain a fused image $I_f$ of all the spatial frequencies.

According to the invention, digital fusion of the luminance image $I_{1L}$ and of the second image $I_2$ is based on a frequency analysis and contrasts of the images as performed by the human eye.

In one particular embodiment of the method, the decomposition into spatial frequencies involves successively applying an averaging or low-pass filter to each luminance image $I_{1L}$ and second image $I_2$, according to the following equation:

$$F_n^{1L\,ou\,2} = G_n = G_{n-1} * S$$

where $G_1 = I_e * S$

S denotes a low-pass filter $I_e$ denotes the input image $I_{1L}$ or $I_2$

In practice, the image $F_n^{1L\,ou\,2}$ containing the highest frequency is represented by $F_1^{1L\,ou\,2}$ and that containing the lowest frequency is represented by $F_h^{1L\ ou\ 2}$ where h represents the number of convolution operations applied to the input image $I_e$.

Likewise in a practical embodiment of the invention, the stage ii) involves calculating the energy according to the following formulation:

$$E_n^{1Lou2}(x, y) = \text{Var}\left(F_n^{1Lou2}\left(\left[x - \frac{k_x}{2}, x + \frac{k_x}{2}\right], \left[y - \frac{k_y}{2}, y + \frac{k_y}{2}\right]\right)\right)$$

where $k_x$ and $k_y$ represent the dimensions of an analysis window.

This energy is calculated as a local variance in a window of dimensions $k_x \times k_y$.

The weighted images $P_n^1$, $P_n^2$ can be obtained as follows:

$$P_n^{1L}(x, y) = \frac{\Delta E_n^{max}(x, y) + \Delta E_n(x, y)}{2 \cdot \Delta E_n^{max}}$$

$$P_n^2(x, y) = \frac{\Delta E_n^{max}(x, y) - \Delta E_n(x, y)}{2 \cdot \Delta E_n^{max}}$$

Where: $\Delta E_n(x,y) = E_n^{1L}(x,y) - E_n^2(x,y)$ and
$\Delta E_n^{max} = \max(\Delta E_n(x,y))$, $P_n^{1ou2}(x,y) \in [0,1]$ The weighting operators thus defined make it possible to favour the data derived from the first image in the visible spectrum or the second infra-red image, depending on their relevance. If the energy is equivalent in both images $F_n^{1L}$ and $F_n^2$, the weighting operator will represent equivalently one and the other of the images which will not be the case if the energies prove to be different.

Finally, the recombination stage involves performing the following calculation:

$$I_f = \sum_{n=1}^{h} F_n'$$

where h represents the number of frequency components.

When the colour has a critical aspect of discrimination/identification for the observer, it may be preferable not to modify the colorimetry of the final image displayed in an observation eyepiece.

To this end, stage c) therefore preferably involves performing a decomposition of the first image $I_1$ into a luminance image $I_{1L}$ and two chrominance images $I_{1C_b}$ and $I_{1C_r}$. Stage e) then involves recombining or resynchronising the fusion image $I_f$ with the chrominance images $I_{1C_b}$ and $I_{1C_r}$.

In a practical embodiment, the first sensor is capable of covering a spectral range belonging to the interval included between 0.4 and 1.1 µm.

In another characteristic of the invention, the second sensor is capable of covering a second spectral range belonging to the range of infra-red wavelengths.

The second sensor may be capable of covering a spectral range belonging to the interval included between 7.5 and 14 µm.

Other details, characteristics and advantages of the invention will appear upon reading the following description given by way of a non-restrictive example while referring to the appended drawings.

DETAILED DESCRIPTION OF THE INVENTION

Figure 1:
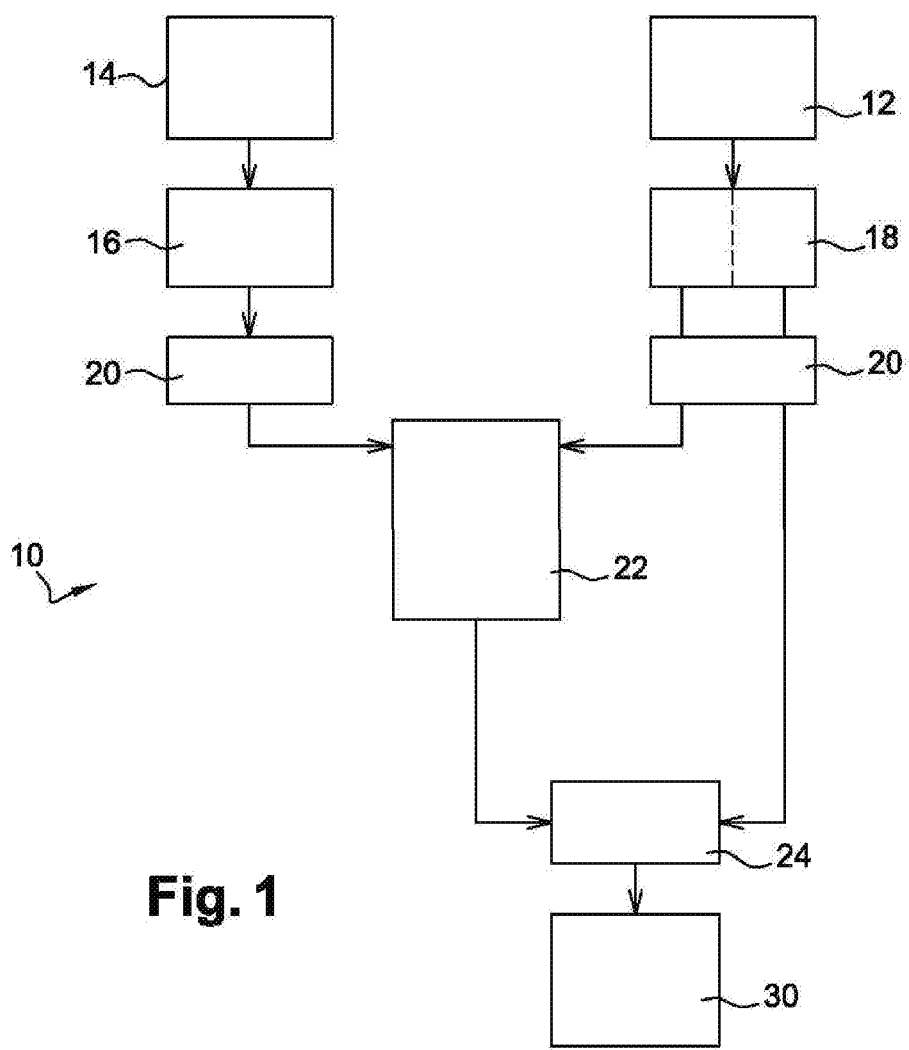
FIG. 1 is a flow chart of the main processing stages performed using the method according to the invention.

Reference is first made to FIG. 1 which shows the principle of image acquisition and processing according to the invention. The image processing method according to the invention is intended to be implemented in a device comprising a casing housing at least two image sensors capable of covering different spectral ranges.

By way of an example, the casing thus comprises a first image sensor covering a spectral range included between 0.4 and 1.1 µm located in the visible range and a second image sensor capable of covering a spectral range included between 7.5 and 14 µm located in the infra-red range. Both sensors are arranged in the casing so as to be capable of forming images of a same zone of space.

The method 10 according to the invention involves acquiring a first image $I_1$ in 12 of a given zone of space using the first sensor and acquiring a second image $I_2$ in 14 of the same zone of space using the second sensor.

Firstly, the second image $I_2$ undergoes recalibration on the first image $I_1$ in 16. This choice essentially results from the dimensions of the sensors used. Generally, infra-red sensors, such as the second sensor, have a lower resolution than sensors in the visible range such as the first sensor. For example, the first sensor may have an image resolution of 1280 by 1024 pixels for 10 bits and the second sensor may have an image resolution of 640 by 480 pixels for 14 bits. Therefore, recalibration essentially involves adapting the resolution of the second image obtained with the second sensor so that it corresponds to the resolution of the first image obtained with the first sensor in order to keep the resolution of the first best defined sensor intact.

This recalibration stage also involves performing complete distortion of the image in order to take account of the enlargement to be made, the rotation, offset and geometric aberrations. In order to perform the recalibration, elements of information can be used a priori, such as the virtually parallel position of the optical axes of the optical systems of the first and second sensors. It is furthermore possible to make the assumption that the corrections to be made to the second image $I_2$ are minimal.

During another stage 18, which can be performed immediately after acquisition of the first image $I_1$, a decomposition of the first image $I_1$ into a luminance image $I_{1L}$ and two chrominance images $I_{1C_b}$ and $I_{1C_r}$ is performed. Since the image $I_1$ is a model image (RGB), this model image (RGB) needs to be converted into an image of a model defining a colorimetric space with three components, namely a luminance component and the two chrominance components. The values of each pixel vary between 0 and 255 for each R, G, and B channel.

An example of a model that can be used is the Y'CbCr model. Other models can be used, such as the Y'PbPr model, the Y'UV model, the TSL model or the Lab model. Generally speaking, any model with which one luminance component and two chrominance components can be obtained may be used.

Calculations with which conversion of a model image (RGB) into one luminance component $I_1$ and two chrominance components $I_{1C_b}$ and $I_{1C_r}$ can be performed according to a Y'CbCr model are provided here by way of non-limiting examples.

Thus, the image $I_1$ is broken down into:

a luminance image noted $I_{1L}$ calculated according to the equation:

$$I_{1L}=0.299R+0.587G+0.114B,$$

a chrominance image $I_{1C_b}$ calculated according to the equation:

$$I_{1C_b}=0.1687R-0.3313G+0.5B+128,$$

and a chrominance image $I_{1C_r}$ calculated according to the equation:

$$I_{1C_r}=0.5R-0.4187G-0.0813B+128.$$

For both models (RGB) and Y'CbCr, the pixel values for each channel vary in this case between 0 and 255.

During a subsequent stage 20, the method involves adapting the dynamics of the image $I_{1L}$ with the second image $I_2$. As mentioned earlier, the first and second images are not acquired with the same dynamics, 10 bits for example for the first image and 14 bits for the second image. It is therefore important to bring the first and second images to a same scale that makes it possible to obtain information concerning each of the first and second images that can be compared. In practice, adaptation of the dynamics allows adjustment of the dynamics of the luminance images $I_{1L}$ and the two chrominance images $I_{1C_b}$, $I_{1C_r}$ with the second image $I_2$.

During a subsequent stage 22, fusion of the luminance image $I_{1C_b}$ with the second image $I_2$ is performed, thereby obtaining the image $I_f$.

Finally, in one or two final stages 24, colour information is added to the fusion image $I_f$ so as to obtain in 30 a fused final image including colour information.

Figure 2:
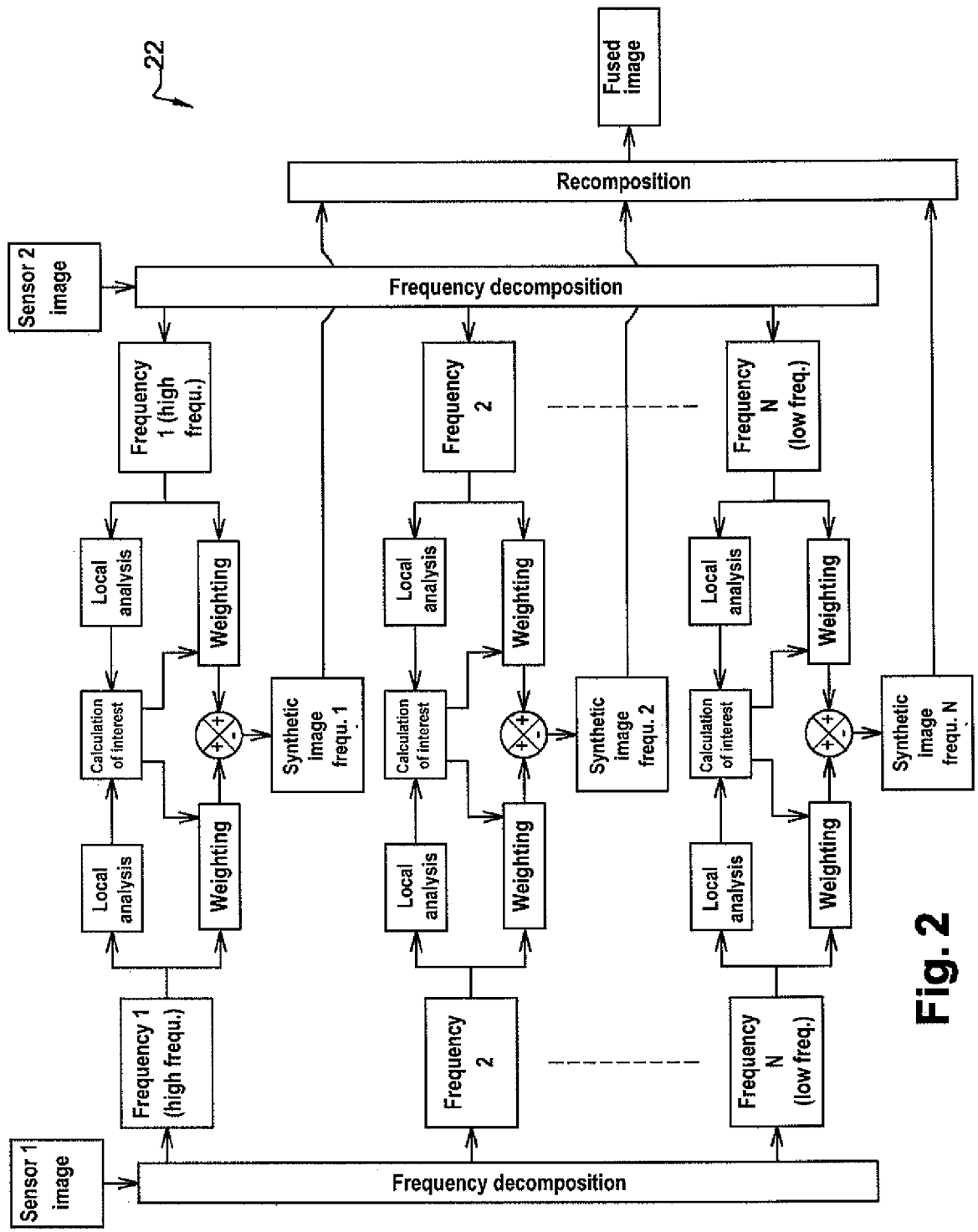
FIG. 2 is a flow chart of the main processing stages performed during the digital fusion stage.
Figure 3:
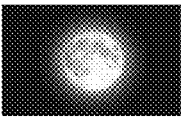
FIG. 3 is a table illustrating standardised levels of darkness.
Figure 3:
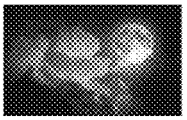
Figure 3:
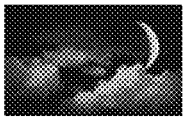
Figure 3:
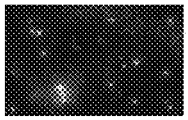
Figure 3:
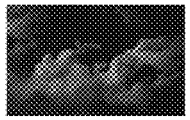

The actual fusion stage 22 will now be described in detail with reference to FIG. 2.

In order to be able to interpret the contents of each of the luminance images $I_{1L}$ and of the second image $I_2$ locally, i.e. at the level of each pixel analysed, decomposition into spatial frequencies is performed. Thus, decomposition into spatial frequencies is performed for the luminance image $I_{1L}$ and the second image $I_2$. Reference is made here to the images $I_{1L}$ and $I_2$ which are images obtained following recalibration and adaptation of the dynamics.

Generally speaking, in order to obtain the first spatial frequency F1 (the highest frequency), the image is initially filtered by convolution with an averaging or "low-pass" filter K, which can adopt the form of a simple local average in a window of m by m pixels, i.e. the form of a Gaussian shape that subsequently weights the pixels of this same calculation window by coefficients following a Gaussian shape. A "filtered" implying "low-pass filtered" image $G_1$ is obtained in this manner:

$$G_1=I_e*S$$

This filtered image is subtracted from the original image. An image F1 that only contains high frequencies is obtained in this case:

$$F_1=I_e-G_1=I_e-(I_e*S)$$

The second spatial frequency $F_2$ is obtained by reproducing the previous pattern, but using the previous filtered image $F_1$ as the input image. This filtered image is therefore filtered again using the same low-pass filter as before and an image $F_2$ is obtained by difference:

$$F_2=G_1-G_2=G_1-(G_1*S)$$

By recurrence, the following is obtained $$G_{n+1}=(G_n*S) \text{ and } F_{n+1}=G_n-(G_n*S)$$

The last frequency h will be represented by the last convolution and will also represent the local average level of the image:

$$F_h=G_h=G_{h-1}*S$$

Thus, one will note $F_n^{1L}=G_{n-1}*S$ with $G_1=I_{1L}*S$ and $F_n^2=G_{n-1}*S$ with $G_1=I_2*S$.

During a second processing stage, an energy calculation in at least some of the zones of the images of each of the frequency components $F_n^{1L}$ and $F_n^2$ is performed. It is chosen here to carry out an analysis compatible with real-time processing allowing instantaneous restitution of data to an observer. To do this, an analysis by comparison of the energies of each of the images $F_n^{1L}$ and $F_n^2$ is performed. This analysis involves calculating the local variance in a window of dimensions $k_x \times k_y$ centered on the pixel analysed, which yields:

$$E_n^{1L}(x,y) = \text{Var}\left(F_n^{1L}\left(\left[x-\frac{k_x}{2}, x+\frac{k_x}{2}\right], \left[y-\frac{k_y}{2}, y+\frac{k_y}{2}\right]\right)\right)$$

and, $$E_n^2(x,y) = \text{Var}\left(F_n^2\left(\left[x-\frac{k_x}{2}, x+\frac{k_x}{2}\right], \left[y-\frac{k_y}{2}, y+\frac{k_y}{2}\right]\right)\right)$$

During a subsequent stage, the method involves calculating a weighting image $P_n^{1L}$, $P_n^2$, for each of the images $F_n^{1L}$, $F_n^2$ associated with a frequency component n, based on the local analysis performed at the preceding stage. For this purpose, the difference of these energies is calculated:

$$\Delta E_n(x,y)=E_n^{BNL}(x,y)-E_n^{1R}(x,y)$$

The maximum is subsequently calculated:

$$\Delta E_n^{max}=\max(\Delta E_n(x,y))$$

Next, a weighting image is calculated for each frequency component, with these weightings being such that:

$$P_n^{1L}(x,y) = \frac{\Delta E_n^{max}(x,y) + \Delta E_n(x,y)}{2 \cdot \Delta E_n^{max}}$$

$$P_n^2(x,y) = \frac{\Delta E_n^{max}(x,y) - \Delta E_n(x,y)}{2 \cdot \Delta E_n^{max}}$$

with $P_n(x,y) \in [0,1]$

The weighting images for each spatial frequency $P_n^{1L}(x,y)$ and $P_n^2(x,y)$ are subsequently applied to the respective images $F_n^{1L}$ and $F_n^2$ and are finally summed according to the following equation:

$$F'_n(x,y)=P_n^{1L}(x,y) \cdot F_n^{1L}(x,y)+P_n^2(x,y) \cdot F_n^2(x,y)$$

The synthetic image $F'_n(x,y)$ for the spatial frequency n thus closer, owing to the weighting applied, to the image $F_n^{1L}$ and $F_n^2$ which contains the most information.

Recomposition of the spatial frequencies is the reverse process of stage 1. One therefore begins with the lowest frequency h, i.e. the last obtained from the decomposition described above, resulting in:

$$G'_h=F'_h$$

Recomposition is subsequently performed using the previous spatial frequencies:

$$G'_{h-1} = F'_{h-1} + G'_h$$

If $I_f$ is the result of recombination, then:

$$I_f = G_0 = \sum_{n=1}^{h} F'_n$$

where h represents the number of frequency components.

After obtaining the fusion image $I_f$, the method involves adding colour information to the fusion image $I_f$.

Hence, the method involves using the colour of the first sensor. For this purpose, addition of the colour information is performed by summing or resynchronising the fusion image $I_f$ with the chrominance images $I_{1C_b}$ and $I_{1C_r}$, the dynamics of which have been adapted as mentioned above.

In practice, it will be understood that this type of addition of colour information will prove less and less relevant as the level of luminosity of the observed area decreases. Indeed, the colour information derived from the chrominance images will gradually decrease.

It should be remembered that levels of darkness have long been standardised according to the table below, which is repeated for information purposes and is well known from the state of the art.

The units indicated in the table above are in lux, which is the unit derived from the international system, such that 1 lux=1 cd·sr·m$^{-2}$. This table shows the darkness level values depending on the illuminance, a type of sky being associated with each darkness level.

Having described the invention, the following is claimed:

1. An image processing method using a device comprising at least one casing comprising at least one image sensor capable of covering a first spectral range and at least one second image sensor capable of covering a second spectral range different from the first spectral range, wherein the first and second sensors are capable of forming images of a same zone of space, with the first sensor being capable of covering a spectral range belonging to the range of wavelengths of the visible spectrum, wherein the method comprises:
   a) acquiring a first image $I_1$ of said given zone of space by means of the first image sensor,
   b) acquiring a second image $I_2$ of said given zone of space by means of the second image sensor,
   c) performing a decomposition of the first image $I_1$ so as to obtain at least one luminance image $_{1L}$,
   d) obtaining an image $I_f$ resulting from digital fusion of the luminance image $I_{1L}$ and of the second image $I_2$, and
   e) adding colour information to the fusion image $I_f$,
   wherein the digital fusion involves:
      i. carrying out decompositions, noted respectively $F_n^{1L}$ and $F_n^2$, into successive spatial frequencies n of the luminance image $I_{1L}$ and of the second image $I_2$,
      ii. performing an energy calculation in at least some of the zones of the images $F_n^{1L}$, $F_n^2$ each associated with a frequency component n,
      iii. calculating a weighting image $P_n^{1L}$, $P_n^2$, for each of the images $F_n^{1L}$, $F_n^2$ associated with a frequency component n, based on the local analysis performed at the preceding stage,
      iv. for each image $F_n^{1L}$, $F_n^2$ associated with a frequency component, performing the following calculation:

$$F'_n(x,y) = P_n^{1L}(x,y) \cdot F_n^{1L}(x,y) + P_n^2(x,y) \cdot F_n^2(x,y), \text{ and}$$

v. performing a recombination of all the images $F'_n$ each associated with a frequency component n, so as to obtain a fused image $I_f$ of all the spatial frequencies.

2. A method according to claim 1, wherein prior to step c), adapting the dimensions of that of the first image $I_1$ and of the second image $I_2$ having the lowest resolution to the dimensions of the other of the first image and the second image.

3. A method according to claim 1, wherein prior to step c), matching the dynamics of the first image $I_1$ to the dynamics of the second image $I_2$.

4. A method according to claim 1, wherein the digital fusion includes a step of carrying out successive spatial frequency decompositions n of the luminance image $I_{1L}$, and of the second image $I_2$.

5. A method according to claim 4, wherein the decomposition into spatial frequencies involves successively applying an averaging or low-pass filter to each luminance image $I_{1L}$, and second image $I_2$, according to the following equation:

$$F_n^{1Lou2} = G_n = G_{n-1} * S$$

where $G_1 = I_e * S$
   S denotes a low-pass filter
   $I_e$ denotes the input image $I_{1L}$ or $I_2$.

6. A method according to claim 1, wherein step ii) involves calculating the energy according to the following formulation:

$$E_n^{1Lou2}(x, y) = \text{Var}\left(F_n^{1Lou2}\left(\left[x - \frac{k_x}{2}, x + \frac{k_x}{2}\right], \left[y - \frac{k_y}{2}, y + \frac{k_y}{2}\right]\right)\right)$$

where $k_x$ and $k_y$ represent the dimensions of an analysis window.

7. A method according to claim 6, wherein the weighting images $P_n^1$, $P_n^2$ are obtained as follows:

$$P_n^{1L}(x, y) = \frac{\Delta E_n^{max}(x, y) + \Delta E_n(x, y)}{2 \cdot \Delta E_n^{max}}$$

$$P_n^2(x, y) = \frac{\Delta E_n^{max}(x, y) - \Delta E_n(x, y)}{2 \cdot \Delta E_n^{max}}$$

Where: $\Delta E_n(x,y) = E_n^{1L}(x,y) - E_n^2(x,y)$ and $\Delta E_n^{max} = \max(\Delta E_n(x,y))$.

8. A method according to claim 1, wherein the recombination stage involves performing the following calculation:

$$I_f = \sum_{n=1}^{h} F'_n$$

where h represents the number of frequency components.

9. A method according to claim 1, wherein step c) involves carrying out a decomposition of the first image $I_1$ into a luminance image $I_{1L}$, and two chrominance images $I_{1C_b}$ and $I_{1C_r}$.

10. A method according to claim 9, wherein step e) involves summing the fusion image $I_f$ with the chrominance images $I_{1C_b}$ and $I_{1C_r}$.

11. A method according to claim 1, wherein the first sensor is capable of covering a spectral range belonging to the interval included between 0.4 and 1.1 µm.

12. A method according to claim 1, wherein the second sensor is capable of covering a second spectral range belonging to the range of infra-red wavelengths.

13. A method according to claim 12, wherein the second sensor is capable of covering a spectral range belonging to the interval included between 7.5 and 14 µm.

* * * * *